United States Patent [19]

Petrov

[11] 4,097,984
[45] Jul. 4, 1978

[54] SECTOR OF AUTOMATIC PRODUCTION LINE

[75] Inventor: Georgi Nikolov Petrov, Sofia, Bulgaria

[73] Assignee: Institute za Metallorejeshti Machini, Sofia, Bulgaria

[21] Appl. No.: 683,620

[22] Filed: May 5, 1976

[30] Foreign Application Priority Data

May 7, 1975 [BG] Bulgaria .................................. 29895

[51] Int. Cl.² ........................ B23B 25/00; B23P 23/06
[52] U.S. Cl. ...................................... 29/563; 29/33 P; 82/2.7
[58] Field of Search ................... 29/563, 33 P; 82/2.5, 82/2.7, 8

[56] References Cited

U.S. PATENT DOCUMENTS

| Re. 25,886 | 10/1965 | Cargill | 29/563 X |
|---|---|---|---|
| 3,400,618 | 9/1968 | Steinmetz | 82/2.5 |
| 3,543,392 | 12/1970 | Perry et al. | 29/563 |

FOREIGN PATENT DOCUMENTS 1,237,005  3/1967  Fed. Rep. of Germany ......... 82/2.5

*Primary Examiner*—Othell M. Simpson
*Assistant Examiner*—Z. R. Bilinsky
*Attorney, Agent, or Firm*—Karl F. Ross

[57] ABSTRACT

Workpiece blanks to be machined are transported on a conveyor past a bank of machine tools operating in parallel, each blank resting on an individual carriage which is slippably entrained by the conveyor so as to be arrestable at a stop in line with a machine tool by an escapement-type rocker in response to a signal from a sensing switch detecting the presence of such a blank on an arriving carriage. A gantry-type manipulator picks up the blank and delivers it to the associated machine tool while removing therefrom a workpiece already machined and depositing it on the waiting carriage in a position laterally offset from the one previously occupied by the blank. Another sensing switch at each stop, upon detecting the presence of a workpiece already machined on a carriage, lets that carriage continue on its way without actuation of the corresponding manipulator.

2 Claims, 4 Drawing Figures

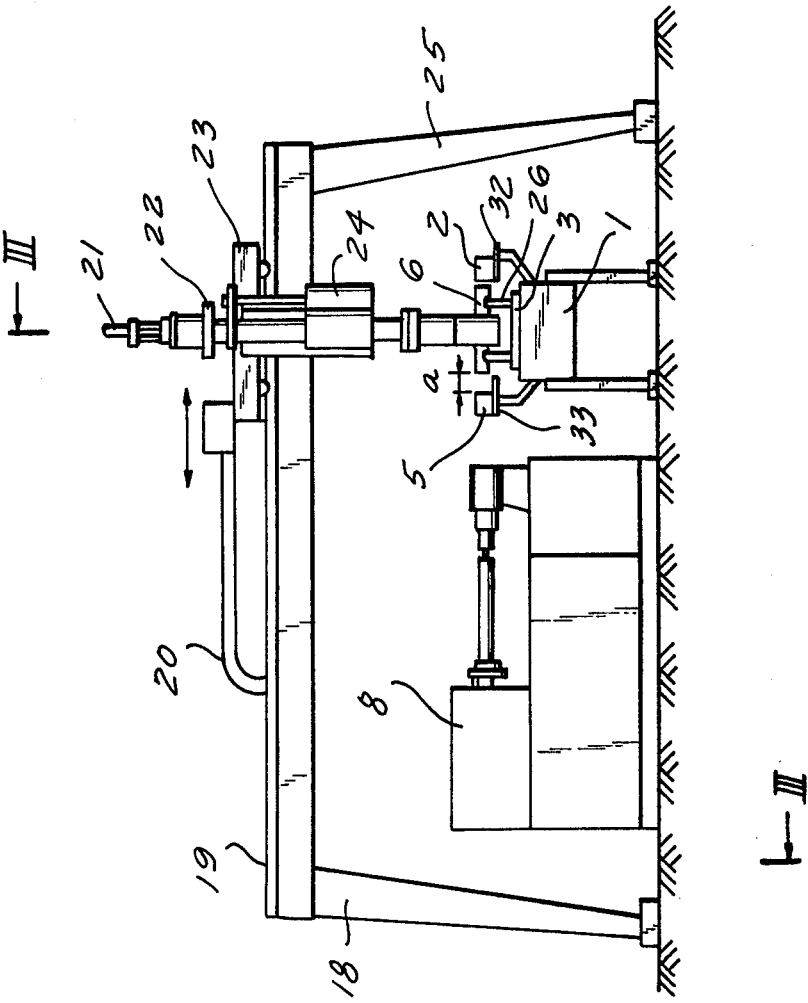

SECTOR OF AUTOMATIC PRODUCTION LINE

FIELD OF THE INVENTION

My present invention relates to a sector of an automatic production line with a bank of machine tools, working in parallel for the performance of one and the same operation, which are fed with rotationally symmetrical workpieces by means of automatic manipulators with program control.

BACKGROUND OF THE INVENTION

Systems are known with two parallel conveyors in such a sector, one of them delivering blanks to the automatic manipulators while the other carries away the machined workpieces placed thereon by these manipulators. The basic disadvantage of such systems is the need for large capital investments.

OBJECT OF THE INVENTION

It is therefore the object of my present invention to provide means for simplifying such a production-line sector with elimination of one of the two conveyors heretofore considered necessary.

SUMMARY OF THE INVENTION

This object is realized, in accordance with my invention, by the provision of a single conveyor passing through a plurality of stops each aligned with a respective machine tool in a group or bank of such machine tools operating in parallel, the conveyor serving for the slippable entrainment of a plurality of carriages transporting individual workpieces to be machined. Each stop is provided with retaining means for temporarily arresting an oncoming carriage and with first sensing means for detecting the presence of an unmachined workpiece or blank only in a first position of such a carriage. A manipulator at each stop is operable under the control of the first sensing means to pick up a blank from its first position on the oncoming carriage for delivery to the associated machine tool and for the transfer of a previously machined workpiece from that machine tool to a second position on the same carriage. The presence of such a machined workpiece in the second position on an oncoming carriage is detected at each stop by second sensing means controlling the associated retaining means for giving passage to a carriage loaded with a workpiece already machined.

Pursuant to a more particular feature of my invention, the aforementioned first and second positions are laterally offset from each other, with the corresponding sensing means disposed along opposite sides of the conveyor. The sensing means referred to may be of electric, hydraulic, pneumatic or any other convenient type known per se.

BRIEF DESCRIPTION OF THE DRAWING

My invention will now be described in greater detail with reference to the accompanying drawing in which:

FIG. 2 is an elevational view, perpendicular to that of FIG. 1 and drawn to a larger scale, of a machine tool and an associated manipulator forming part of the production-line sector;

FIG. 3 is a cross-sectional view of the manipulator of FIG. 2, taken on the line III — III thereof but with omission of the associated machine tool.

SPECIFIC DESCRIPTION

Figure 1:
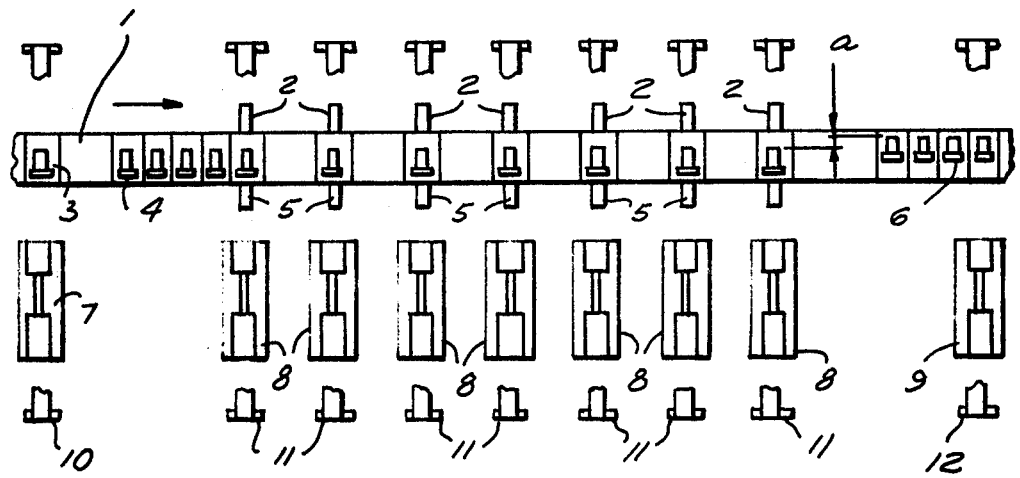
FIG. 1 is a top view of a sector of an automatic production line embodying my invention.

In FIG. 1 I have shown part of a production line serving for the machining of workpieces by several groups of machine tools 7, 8 and 9 pertaining to different sectors of the production line. The more fully illustrated middle sector includes a bank of seven such machine tools 8 with associated gantry-type manipulators 11 which are partly broken away in this view; similar manipulators 10 and 12 are associated with the machine tools 7 and 9 of the preceding and subsequent sectors.

A conveyor 1 moving past all these machine tools slippably supports a series of carriages 3 serving for the transportation of unmachined workpieces or blanks 4; the workpieces machined in sector 8, 11 have been designated 6.

The conveyor 1 is flanked by two sets of sensors 2, 5 disposed on opposite sides thereof in line with respective machine tools 8. Sensors 5 detect the presence of blanks 4 on oncoming carriages in which these blanks occupy positions proximal to these sensors, i.e. in the right-hand half of a carriage as viewed in the direction of conveyor movement indicated by an arrow A. The machined workpieces 6 are disposed on their carriages in different positions, i.e. on the left-hand half of a carriage, adjacent the sensors 2 which serve to detect their presence. The lateral offset between the two workpiece positions has been indicated at $a$ in FIG. 1.

Figure 4:
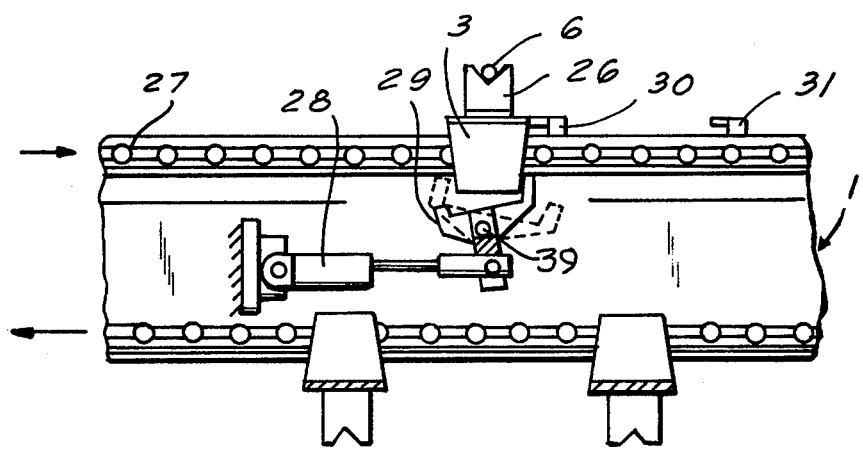
FIG. 4 is a fragmentary side view, also drawn to a larger scale, of a conveyor forming part of the assembly of FIG. 1.

As more particularly illustrated in FIG. 4, conveyor 1 comprises a moving endless chain 27, continuously advancing with a stepwise motion, serving for the frictional entrainment of the carriages 3 with workpieces cradled in knife-edge supports 26 (see also FIG. 2). An escapement-type rocker 29, in the vicinity of the upper run of chain 27, is pivotable about a fulcrum 39 with the aid of a hydraulic cylinder or jack 28 controlled by a nonillustrated relay system. The presence of a carriage 3, intercepted by the rocker 29 in a position of alignment with as associated machine tool 8 (FIG. 1), is detected by an electric switch 30; a similar switch 31, located further downstream, detects the release of the carriage by the rocker 29. In its arrested position, carriage 3 supports a workpiece 4 or 6 in a vertical plane aligned with the pivotal axis 39 and with the shaft 34 (FIG. 2) of the associated machine tool 8. The escape of a previously intercepted carriage by the rocker is facilitated by a swing thereof into an alternate position indicated in dotted lines. In this latter position the rocker 29 prevents the next-following carriage from entering the work zone of the corresponding machine tool.

Sensors 2 and 5, supported on consoles 32 and 33 as shown in FIG. 2, are inductive transducers which generate electric signals upon the passage of a machined workpiece 6 or a blank 4, respectively.

Details of a gantry-type manipulator 11 are shown in FIGS. 2 and 3. The manipulator comprises a carriage 23 with wheels 35 riding on a horizontal beam 19 which lies above the level of the associated machine tool 8 and is supported by a pair of columns 18 and 25. Column 18 accommodates an electric panel while column 25 contains a hydraulic unit feeding the several cylinders or jacks. Mounted on carriage 23 are two manipulator arms 13 and 15, arm 13 being swingable in a vertical plane by means of a hydraulic dylinder 16 whereas arm 15 has a fixed vertical position slightly offset from the swing plane of arm 13. The two arms 13 and 15 carry respective grippers 38 and 17; gripper 38 is engageable with blanks 4 to be taken from a carriage for machining whereas gripper 17 serves to return machined workpieces 6 to a carriage. Hydraulic cylinders 24 and 37 serve for the axial displacement of grippers 38 and 17, respectively. The stationary arm 13 is further provided with a hydraulic cylinder 21 for opening and closing the jaws of gripper 17 as well as a cylinder 22 for rotating that gripper about its axis; the swingable arm 13 is similarly equipped. The relative mobility of the two arms avoids any collisions between their grippers or between workpieces 4 and 6 engaged by them.

A line for the supply of hydraulic fluid to the several cylinders of the manipulator has been indicated at 20. The reciprocation of carriage 23 along beam 19, indicated by an arrow B in FIG. 2, is brought about by a pinion 14 on the carriage, driven by a nonillustrated hydraulic motor, in mesh with a rack 36 on the beam.

The various operations are controlled by a drum-type programmer (not shown) and by cam-operated limit switches tripped by the reciprocating carriage 23 of each manipulator 11.

Let us now consider the operation of a particular machine tool 8 which, having completed the machining of a preceding workpiece, is ready to receive a new blank 4. With no carriage present in the working position of FIG. 4, as indicated by the sensors 30 and 31, rocker 29 is rotated counterclockwise from its dotted-line escape position to its full-line waiting position for interception of the next carriage loaded with a blank 4. Upon detection of such a blank by the corresponding sensor 5, the joint operation of sensors 5 and 30 starts a new cycle of operations in which manipulator arm 13 picks up the blank 4 on the carriage just arrived and delivers it to the machine tool 8 whereas arm 15 seizes the previously machined workpiece 6 and places it on the carriage in the proper position as discussed above.

The carriage is then allowed to proceed. If an oncoming carriage is loaded with a workpiece 6 already machined, the joint operation of sensors 2 and 30 reverses the rocker 29 to let that carriage pass on even if this particular machine tool has already finished its operation.

I claim:

1. In an automatic production line with a group of machine tools operating in parallel, the combination therewith of:
   a conveyor passing through a plurality of stops each aligned with a respective machine tool;
   a plurality of carriages slippably entrained by said conveyor for the transportation of individual workpieces to be machined;
   retaining means at each stop for temporarily arresting an oncoming carriage;
   first sensing means at each stop for detecting the presence of an unmachined workpiece only in a first position on an oncoming carriage;
   a manipulator at each stop operable under the control of said first sensing means to pick up an unmachined workpiece from said first position on an oncoming carriage for delivery to the associated machine tool and transfer of a previously machined workpiece from said associated machine tool to a second position on the same carriage; and
   second sensing means at each stop for detecting the presence of a machined workpiece on an oncoming carriage in said second position only, said retaining means being responsive to said second sensing means for giving passage to a carriage loaded with a machined workpiece.

2. The combination defined in claim 1 wherein said first and second positions are laterally offset from each other, said first and second sensing means being disposed along opposite sides of said conveyor.

* * * * *